US007381483B2

(12) United States Patent
Cheng et al.

(10) Patent No.: US 7,381,483 B2
(45) Date of Patent: Jun. 3, 2008

(54) CORE HAVING MAGNETIC PROPERTIES

(75) Inventors: Ka Wai Eric Cheng, Hong Kong (HK); Chak Yin Tang, Hong Kong (HK); David Ki Wai Cheng, Hong Kong (HK); Hang Wu, Hong Kong (HK)

(73) Assignee: The Hong Kong Polytechnic University, Kowloon (HK)

( * ) Notice: Subject to any disclaimer, the term of this patent is extended or adjusted under 35 U.S.C. 154(b) by 369 days.

(21) Appl. No.: 10/974,021

(22) Filed: Oct. 27, 2004

(65) Prior Publication Data

US 2005/0151123 A1 Jul. 14, 2005

Related U.S. Application Data

(63) Continuation-in-part of application No. 10/177,751, filed on Jun. 24, 2002, now abandoned.

(51) Int. Cl.
*G11B 5/66* (2006.01)
(52) U.S. Cl. .................................. 428/843.7; 428/844.5
(58) Field of Classification Search ...................... None
See application file for complete search history.

(56) References Cited

U.S. PATENT DOCUMENTS

| 3,607,675 | A | 9/1971 | Haines |
| 4,113,641 | A | 9/1978 | Brana et al. |
| 4,444,850 | A | 4/1984 | Matsufuji et al. |
| 4,820,338 | A | 4/1989 | Ochiai et al. |
| 5,138,546 | A | 8/1992 | Johnson et al. |
| 5,977,853 | A | 11/1999 | Ooi et al. |
| 2005/0007232 | A1* | 1/2005 | Ono et al. .................. 336/213 |

OTHER PUBLICATIONS

CRC Handbook of Chemistry and Physics, 1995, pp. 4-15.

* cited by examiner

*Primary Examiner*—Holly Rickman
(74) *Attorney, Agent, or Firm*—Leydig, Voit & Mayer, Ltd.

(57) ABSTRACT

A magnetic core is made of a composite magnetic material having a relative permeability of between 1 and 29 at a frequency range from 20 kHz to 2.5 MHz. The composite magnetic material consists of cobalt and nickel particles having an average diameter in the range of 1 to 100 micrometers, and a polymer base binding the particles to form a core.

7 Claims, 3 Drawing Sheets

CORE HAVING MAGNETIC PROPERTIES

BACKGROUND OF THE INVENTION

1. Field of the Invention

The present invention relates to cores for inductors, transformers and like elements used in high frequency power conversion, and to a composition for making said cores.

2. Background Information

Magnetic materials such as ferrites and powered iron are formed into cores for magnetic devices, inductor and transformer cores, for use in, amongst other things, power converters. Ferrites are mixed compounds of ferromagnetic oxides ($Fe_2O_3$) and several oxides of bivalent metals such as Nickel Oxide (NiO), Manganous Oxide (MnO) and Zinc Oxide (ZnO). They exhibit low loss and good high frequency operation characteristics. Powdered irons, such as Molydbenum Permalloy Powder (MPP), are mixed with Nickel and Iron to provide magnetic materials for power conversion applications.

The design of a magnetic device depends on such factors as the permeability, loss factor, and size and shape of the core. The loss in a magnetic device usually accounts for 30-40% of the total loss in a power converter.

Conventional magnetic materials suffer from a number of disadvantages including limited size, brittleness, high loss and high cost. One of the typical problems is that for application in high power conversion, over 20 kW, the magnetic materials for device cores are expensive and difficult to form into the desired shape.

SUMMARY OF THE INVENTION

It is an object of the present invention to provide a core for inductors, transformers and like elements used in high frequency power conversion. It is a further object of the current invention to provide a composition for making said core that has low permeability and losses, or which at least ameliorates the above mentioned disadvantages or provides the public with a useful alternative.

According to a first aspect of the invention there is provided a magnetic core made of a composite magnetic material having a relative permeability of between 1 and 29 at a frequency range from 20 kHz to 2.5 MHz, wherein the composite magnetic material consists essentially of cobalt and nickel particles having an average diameter in the range of 1 to 100 micrometers, and a polymer base for binding the particles to form a core.

Preferably, a ratio of the cobalt and nickel particles to the polymer base is in the range of 1 to 90 percent.

Preferably, a ratio of the cobalt and nickel particles to the polymer base is in the range of 45 to 65 percent.

Preferably, a ratio of the Cobalt particles to the Nickel particles is in the range of 50 to 75 percent.

Preferably, the cobalt and nickel particles have an average diameter in the range of 1 to 18 micrometers.

Preferably, the cobalt particles have an average diameter in the range of 5 to 18 micrometers and the nickel particles have an average diameter in the range of 1 to 4 micrometers.

Preferably, the cobalt and nickel particles are coated with a coupling agent having the formula

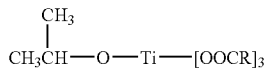

where R is $C_{15}H32$.

Preferably, the polymer base comprises an epoxy resin consisting of 4,4' isopropylidenediphend epichlorohydrin resin, alkyl glycidyl ether and poly-acrylate ether, and a hardener consisting of diethylenetriamine and 2-hydroxy-ethydiethylenetriamine.

According to a second aspect of the invention there is provided a composition having a relative permeability of between 1 and 250 at a frequency range from 20 kH to 2.5 MHz, and consisting essentially of between 45 and 65 percent of cobalt and nickel particles having an average diameter in the range of 1 to 18 micrometers, a polymer base for binding the particles and a coupling agent for enhancing the bond between the particles and polymer base.

Preferably, the a coupling agent has the formula

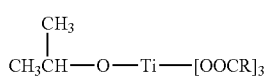

where R is $C_{15}H_{32}$.

Preferably, the polymer base comprises an epoxy resin consisting of 4,4' isopropylidenediphend epichlorohydrin resin, alkyl glycidyl ether and poly-acrylate ether, and a hardener consisting of diethylenetriamine and 2-hydroxy-ethydiethylenetriamine.

Further aspects of the invention will become apparent from the following description, which is given by way of example only.

BRIEF DESCRIPTION OF THE DRAWINGS

Embodiments of the invention will now be described with reference to the accompanying drawings in which.

DESCRIPTION OF THE PREFERRED EMBODIMENTS

Figure 1:
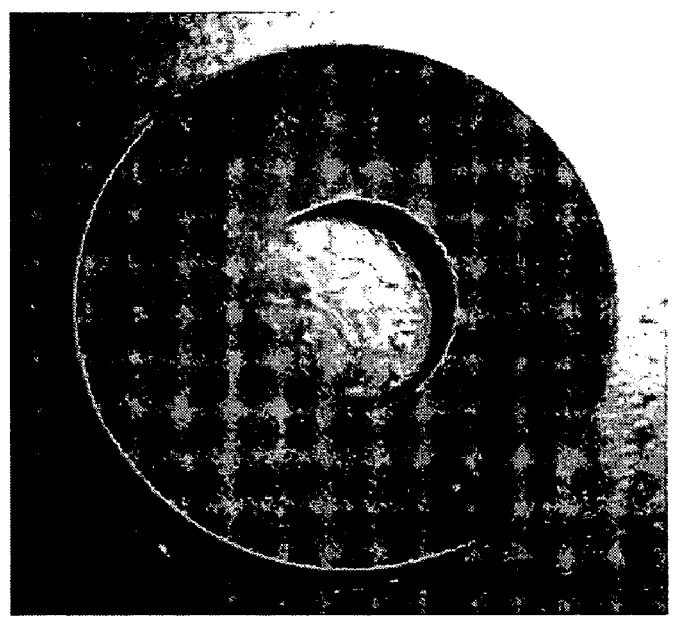
FIG. 1 is a toroid made from a composite magnetic material according to the invention, FIG. 2 of a transformer wound on the toroid of FIG. 1.

A core for inductors, transformers and like elements used in high frequency power conversion is made form a composite magnetic material comprising metal powder filler added to a polymer base material. In the preferred embodiment the polymer base material (Polymer resin) is a combination of epoxy resin and two additives. The epoxy resin is 4,4-isopropylidenediphenol epichlorohydrin resin and the two additives are alkyl glycidyl ether and poly-acrylate ether. The cross-linking agent (hardener) for the epoxy resin contains diethylenetriamine and 2-hydroxyethydiethylen-etriamine. One part of the hardener is mixed with five parts of epoxy resin.

The polymer resin is, thus, a two part mixture. The first part contains the epoxy resin (4,4' isopropylidenediphend epichlorohydrin resin) in the weight range 75%-90% and the two additives, alkyl glycidyl ether in the weight range 5%-20% and poly-acrylate ether in the weight range 10%-15%. The second part is the hardener. This is a mixture of the diethylenetriamine in the weight range of 65%-85% and 2-hydroxyethydiethylenetriamine in the weight range of 15%-35%.

The metal powder filler consists of Cobalt particles and Nickel particles having an average diameter in the range of 1 to 100 micrometers, but preferably between 1 to 18 micrometers. Spherical particles are preferred, but other embodiments may use particles in other shapes, such as cubic, or fibrous structures.

The surface of the Cobalt and Nickel particles is treated with a titanic coupling agent to enhance disbursement through the resin and increase the bond strength between the particles and resin.

The titanic coupling agent comprises 1.5 percent weight of the filler and has the following structure:

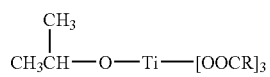

where R is $C_{15}H_{32}$.

An example of the composition consists of 20 grams of the epoxy resin (first part) combined with 4 grams of the hardener (second part). The filler consists of spherical Cobalt particles with diameters in the range of 5-18 micrometers and spherical Nickel particles with diameters in the range of 1-4 micrometers. The surface of the filler particles is treated with the titanic coupling agent. Various quantities of the filler may be added to the resin depending on the magnetic characteristic desired. The following table shows various examples (samples) of compositions of the composite magnetic material.

| Example (Sample) | Cobalt Particles (weight, g) | Nickel Particles (weight, g) | Filler weight-to-weight (%) | Polymer Resin weight-to-weight (%) |
|---|---|---|---|---|
| 1 | 10 | 10 | 45.0 | 55.0 |
| 2 | 12 | 10 | 47.8 | 52.2 |
| 3 | 14 | 10 | 50.0 | 50.0 |
| 4 | 16 | 10 | 52.0 | 48.0 |
| 5 | 18 | 10 | 54.0 | 46.0 |
| 6 | 20 | 10 | 55.6 | 44.4 |
| 7 | 25 | 10 | 59.3 | 40.7 |
| 8 | 30 | 10 | 62.5 | 37.5 |
| 9 | 32 | 10 | 63.6 | 36.4 |

In order to avoid the formation of air bubbles, the blending process of the fillers and the resin is done in a vacuum. Otherwise, the composite will become porous and its electromagnetic properties will deteriorate. After blending, the resultant resin is moulded and cured at room temperature for 30 minutes or until solidified.

FIG. 1 shows a toroid made from the composition with the quantities of example 7 above. The toroid has outer and inner diameters of 1 7/16 inches (37 mm) and 10/16 inches (16 mm) respectively, and a height of 10/16 inches (16 mm). The weight of the core is about 15 grams. The core is stronger and less brittle than an equivalent ferrite or powdered iron core.

Figure 2:
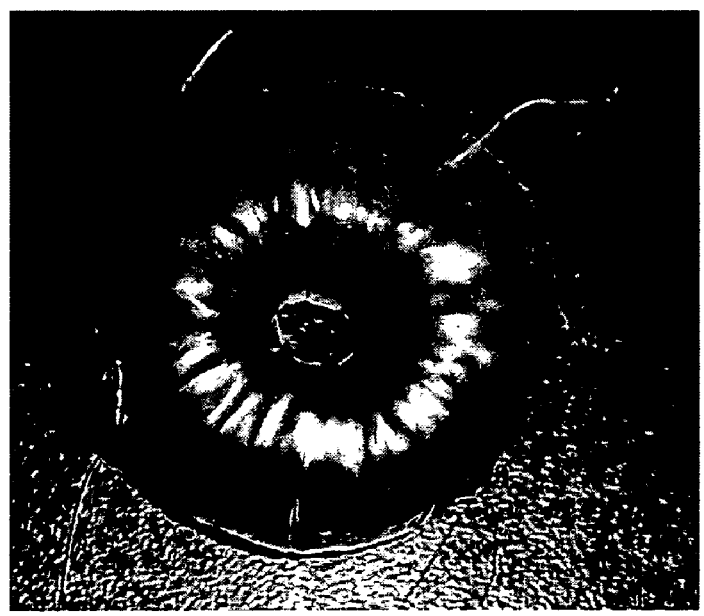
Figure 3:
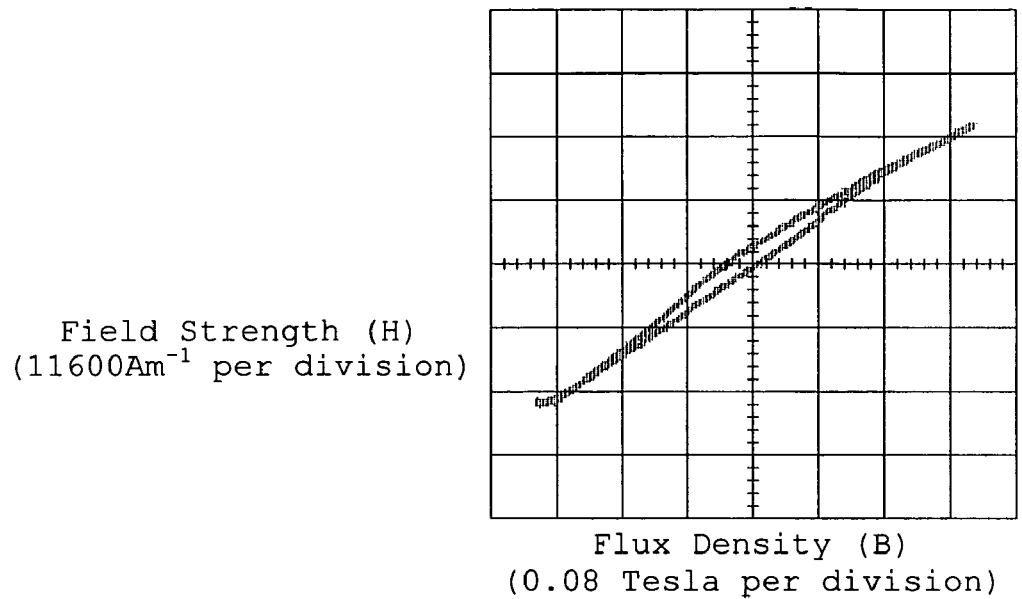
FIG. 3 is a B-H curve for the transformer of FIG. 2.

To test the characteristics of the core made from the composite magnetic material it is wound with 500 turns as shown in FIG. 2. The core was tested at 400 Hz in known manner. FIG. 3 is a B-H curve for the wound core.

The core has a very high saturation point. At a magnetic field strength (H) of 40 kA/m the flux density (B) is only 0.18 T. The core has a low relative permeability of 3.6. The hysteresis loss is 725 $J/m^3$.

Cores made from the composite material have a low relative magnetic permeability and are ideally suited for use in high frequency power conversion applications. The low magnetic permeability also results in better confinement of the leakage field than that of an air-core. For a frequency range from 20 kH to 2.5 MHz at ambient temperature low relative permeability is between 1 and 29. Cores made according to the invention have a relative permeability of less than 10.

In this example, the relative magnetic permeabilities of different compositions ratios of Cobalt particles (Co) and Nickel (Ni) in the filler are listed in the following table. The quantities correspond to those of the Examples given in the previous table.

| Example (Sample) | Cobalt particles (grams) | Nickel particles (grams) | Relative permeability, $\mu_r$ |
|---|---|---|---|
| 2 | 12 | 10 | 1.63 |
| 4 | 16 | 10 | 1.73 |
| 6 | 20 | 10 | 2.71 |
| 7 | 25 | 10 | 3.20 |
| 9 | 32 | 10 | 3.65 |

For these compositions the loss varied between 500 $J/m^3$ and 40 $J/m^3$ with a peak flux density of ±0.2 T.

The composite magnetic compound has other advantages over known core materials including ease of forming. Known methods such as injection moulding can be used which provide savings in manufacturing costs and quality control. Shapes can be obtained that would otherwise require special tools to press and form cores of ferrite or powdered iron.

Desirable characteristics of the composite magnetic material include thermal stability, low environmental deterioration, high mechanical strength and excellent magnetic and electrical properties. Because the polymer is a non-conductive material eddy currents are decreased resulting in the improved efficiency.

Figure 4:
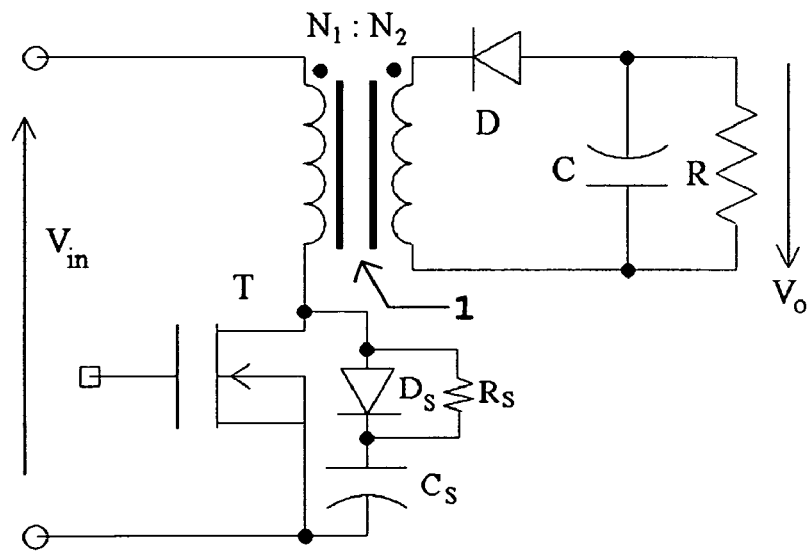
FIG. 4 is a schematic of a flyback converter using a core made from a composite magnetic material according to the invention.

Referring to FIG. 4, a flyback converter includes a 1:1 transformer (usually called coupled inductor for the flyback converter), reference numeral 1, made of the composite magnetic material. Other components of the converter are given in the following table.

| Components | Parameters | Remark |
|---|---|---|
| N1 | 50 | Primary turns |
| T | IRF540 | Switching |
| D | MUR820 | Rectifier |
| C | 33 µF | Smoothing |
| Rs | 1 kΩ | Snubber |
| Cs | 0.03 µF | Snubber |
| Ds | MUR820 | Snubber |

The electrical specification of the flyback converter is:

| Operation | Specification |
|---|---|
| Input voltage Vin | 25-30 V |
| Output voltage Vo | 15-20 V |
| Output power Po | 0-30 W |
| Switching frequency fs | 100 kHz |

Figure 5:
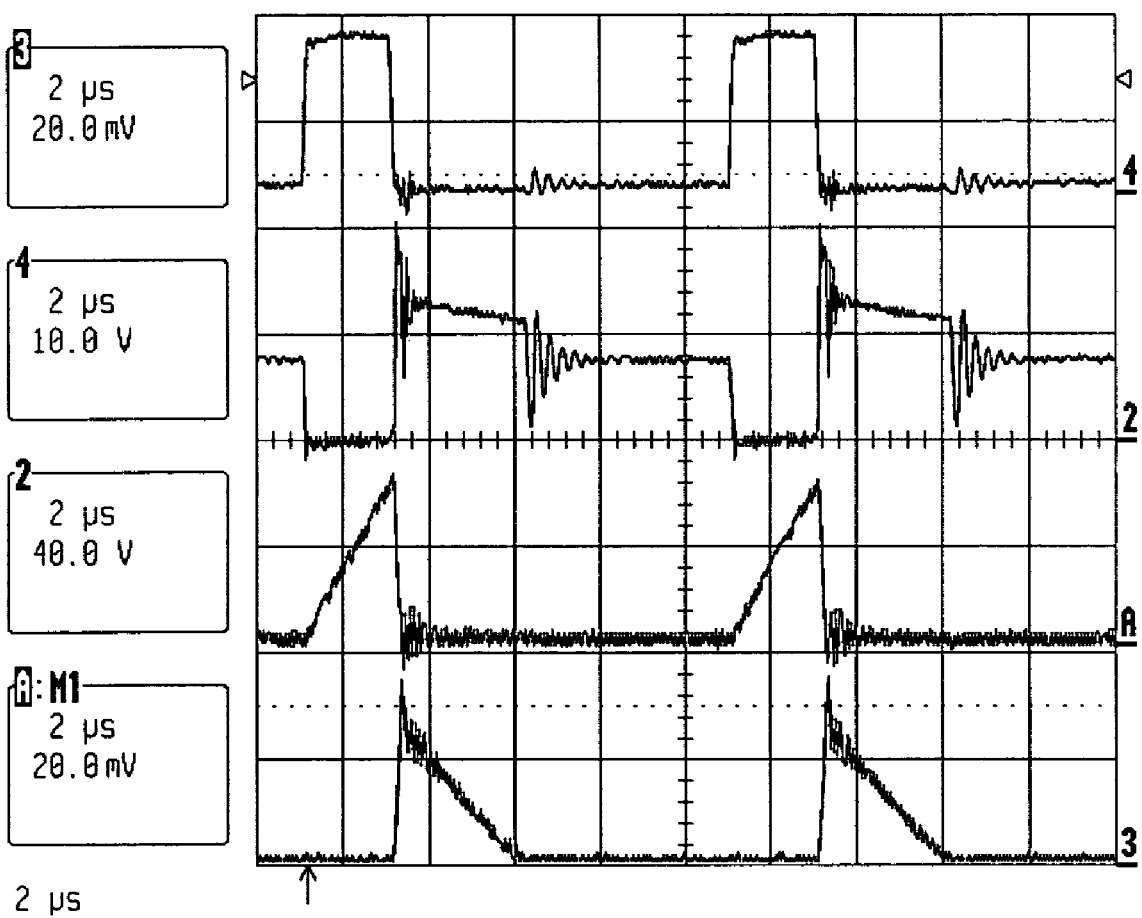
FIG. 5 illustrates test waveforms for the flyback converter.

The flyback converter was tested using a duty ratio of 0.2 and an input voltage of 30V. The resulting waveforms are illustrated in FIG. 5. The converter operated in discontinuous inductor conduction mode. An RCD snubber was added to the switching devices T because the switching noise was especially serious with the converter in discontinuous mode.

The efficiency of the converter was around 68-80% with the output power varied between 5 W-30 W. The inductor current was very linear because the core 1 did not saturate. Operation of the converter was normal confirming that the polymer-bonded composite magnetic material is suitable for use in power converters.

Where in the foregoing description reference has been made to integers or elements having known equivalents then such are included as if individually set forth herein.

Embodiments of the invention have been described, however it is understood that variations, improvements or modifications can take place without departure from the spirit of the invention or scope of the appended claims.

What is claimed is:

1. A core made of a composite magnetic material having a relative permeability in a range from 1 to 29 in a frequency range from 20 kHz to 2.5 MHz, wherein the composite magnetic material comprises:

a mixture of cobalt and nickel particles having an average diameter in a range from 1 to 100 micrometers, and a polymer base binding the mixture of particles and defining the shape of the core, the polymer base comprising an epoxy resin consisting of 4,4' isopropylidenediphend epichlorohydrin resin, alkyl glycidyl ether and poly-acrylate ether, and a hardener consisting of diethylenetriamine and 2-hydroxyethydiethylenetriamine.

2. The core of claim 1, wherein ratio of the mixture of cobalt and nickel particles to the polymer base is in a range from 1 to 90 percent.

3. The core of claim 1, wherein ratio of the mixture of cobalt and nickel particles to the polymer base is in a range from 45 to 65 percent.

4. The core of claim 1, wherein ratio of the cobalt particles to the nickel particles is in a range from 50 to 75 percent.

5. The core of claim 1, wherein the cobalt and nickel particles have an average diameter in a range from 1 to 18 micrometers.

6. The core of claim 1, wherein the cobalt particles have an average diameter in a range from 5 to 18 micrometers and the nickel particles have an average diameter in a range from 1 to 4 micrometers.

7. The core of claim 1 wherein the cobalt and nickel particles are coated with a coupling agent having the formula

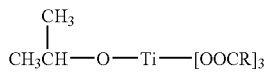

where R is $C_{15}H_{32}$.